United States Patent
Maxey

(10) Patent No.: US 9,879,884 B2
(45) Date of Patent: Jan. 30, 2018

(54) SELF-CALIBRATING SOLAR POSITION SENSOR

(71) Applicant: UT-Battelle, LLC, Oak Ridge, TN (US)

(72) Inventor: Lonnie Curt Maxey, Powell, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 310 days.

(21) Appl. No.: 14/808,265

(22) Filed: Jul. 24, 2015

(65) Prior Publication Data

US 2016/0091298 A1   Mar. 31, 2016

Related U.S. Application Data

(60) Provisional application No. 62/057,294, filed on Sep. 30, 2014.

(51) Int. Cl.
| | |
|---|---|
| *G01C 17/38* | (2006.01) |
| *F24J 2/38* | (2014.01) |
| *G01S 3/786* | (2006.01) |

(52) U.S. Cl.
CPC .............. *F24J 2/38* (2013.01); *G01S 3/7861* (2013.01); *Y02E 10/47* (2013.01)

(58) Field of Classification Search
CPC ...... F24J 2/38; F24J 2/16; Y02E 10/47; Y02E 10/52; G01S 3/7861; G01S 5/163; G06K 9/00805; G06K 9/00201; G06K 9/00771; G06K 9/00798; G06K 9/4633; G06K 9/3241; G06T 11/00; G06T 15/50
See application file for complete search history.

(56) References Cited

U.S. PATENT DOCUMENTS

| | | | |
|---|---|---|---|
| 4,564,275 | A | 1/1986 | Stone |
| 5,455,415 | A | 10/1995 | Yamada et al. |
| 5,592,285 | A | 1/1997 | Pund |

(Continued)

FOREIGN PATENT DOCUMENTS

| | | |
|---|---|---|
| CN | 101694382 | 11/2011 |
| CN | 102354225 | 2/2012 |

(Continued)

OTHER PUBLICATIONS

Taki, Moretza, et al., Experimental Investigation and Construction of PV Solar Tracker Control system Using Image Processing, www.ccsenet.org/mas, Modern Applied Science, 2011, pp. 237-244, vol. 5, No. 6.

*Primary Examiner* — Robert Bachner
(74) *Attorney, Agent, or Firm* — Colin L. Cini

(57) ABSTRACT

A sun positioning sensor and method of accurately tracking the sun are disclosed. The sensor includes a position sensing diode and a disk having a body defining an aperture for accepting solar light. An extension tube having a body that defines a duct spaces the position sensing diode from the disk such that the solar light enters the aperture in the disk, travels through the duct in the extension tube and strikes the position sensing diode. The extension tube has a known length that is fixed. Voltage signals indicative of the location and intensity of the sun are generated by the position sensing diode. If it is determined that the intensity values are unreliable, then historical position values are used from a table. If the intensity values are deemed reliable, then actual position values are used from the position sensing diode.

19 Claims, 8 Drawing Sheets

(56) References Cited

U.S. PATENT DOCUMENTS

| | | |
|---|---|---|
| 6,490,801 B1 | 12/2002 | Hersom et al. |
| 2008/0017784 A1 | 1/2008 | Hoot et al. |
| 2010/0218758 A1 | 9/2010 | Guha et al. |
| 2011/0000478 A1 | 1/2011 | Reznik |

FOREIGN PATENT DOCUMENTS

| | | |
|---|---|---|
| JP | 06077525 | 3/1994 |
| WO | 2011099035 | 8/2011 |

| Time | x position | dx/dt | d²x/dt² |
|---|---|---|---|
| 0 | 7.0 | | |
| 1 | 6.2 | -0.8 | |
| 2 | 5.5 | -0.7 | 0.1 |
| 3 | 4.8 | -0.7 | 0.0 |
| 4 | 3.8 | -1.0 | -0.3 |
| 5 | 2.9 | -0.9 | 0.1 |
| 6 | 2.2 | -0.7 | 0.2 |
| 7 | 5.8 | 3.6 | 4.3 |
| 8 | 6.5 | 0.7 | -2.9 |
| 9 | 2.0 | -4.5 | -5.2 |
| 10 | 0.5 | -1.5 | 3.0 |

FIG 5

SELF-CALIBRATING SOLAR POSITION SENSOR

CROSS-REFERENCE TO RELATED APPLICATIONS

This application claims priority to U.S. Provisional Patent Application Ser. No. 62/057,294, filed 30 Sep. 2014, titled "Self-Calibrating Solar Position Sensor", and is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

THE NAMES OF THE PARTIES TO A JOINT RESEARCH AGREEMENT

None.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None.

STATEMENT REGARDING PRIOR DISCLOSURES BY THE INVENTOR OR A JOINT INVENTOR

None.

BACKGROUND OF THE INVENTION

1. Field of the Invention

The present disclosure relates to renewable energy and more specifically to a solar position sensor apparatus and method.

2. Description of the Related Art

Solar energy collection systems that concentrate sunlight (e.g. for lighting, heating, or electricity production) must track the sun's relative motion during the day to optimize their efficiency. Many solar trackers use "closed loop" feedback control, where a solar position sensor is used to optically ascertain, usually through shadowing or imaging methods, the position of the sun relative to the concentrator. The output from this position sensor is then used to provide closed loop positioning feedback to adjust actuators to ensure that the concentrator is pointed at the sun.

Other solar trackers use "open loop" control and rely on solar position equations, such as those developed by Flandern and Pulkkinen, to calculate the position of the sun based on the latitude, longitude, date and time and control positioning actuators to ensure the concentrator is pointed at the sun without the need for any active solar position sensing.

One example of an open loop tracker is a Polar Aligned Single Axis Tracker (PASAT). This tracker uses a clock motor to rotate at the same angular rate as the rotation of the earth and is aligned so that its rotation axis is parallel to the axis of the earth. Neglecting gravitational effects of other celestial objects, it follows the apparent path of the sun throughout the course of the day. In the case of open loop solar trackers, a solar position sensor may still be used to correct for errors that may arise due to imperfections in the structure to which the tracker is mounted (e.g. being out of level, exhibiting self-weight deflection in various positions, gravitational effects of other celestial objects etc.).

Single axis trackers have one degree of freedom that acts as an axis of rotation. The axis of rotation of single axis trackers is typically aligned along a true North meridian. It is possible to align them in any cardinal direction with advanced tracking algorithms. There are several common implementations of single axis trackers. These include horizontal single axis trackers (HSAT), vertical single axis trackers (VSAT), tilted single axis trackers (TSAT) and polar aligned single axis trackers (PSAT). The orientation of the module with respect to the tracker axis is important when modeling performance.

Dual axis trackers have two degrees of freedom that act as axes of rotation. These axes are typically normal to one another. The axis that is fixed with respect to the ground can be considered a primary axis. The axis that is referenced to the primary axis can be considered a secondary axis. There are several common implementations of dual axis trackers. They are classified by the orientation of their primary axes with respect to the ground. Two common implementations are tip-tilt dual axis trackers (TTDAT) and azimuth-altitude dual axis trackers (AADAT). The orientation of the module with respect to the tracker axis is important when modeling performance. Dual axis trackers typically have modules oriented parallel to the secondary axis of rotation. Dual axis trackers allow for optimum solar energy levels due to their ability to follow the sun vertically and horizontally. No matter where the sun is in the sky, dual axis trackers are able to angle themselves to be in direct contact with the sun.

Unfortunately, one of the issues that arises with solar position sensors is the effect of haze and clouds on the fidelity of the position information. Most solar position sensors operate by locating the centroid of the sky's intensity, which, in a clear sky condition, would represent the sun. However, the effect of clouds and haze can cause that centroid to be displaced from the actual position of the sun. Examples are: an overcast sky with solar disk dimmed and surrounded by scattered light; a clear view of sun when it is surrounded by brightly reflecting clouds, and a small thin cloud directly in front of the sun producing large bright spot whose centroid may differ from the sun's actual position.

In the case of closed loop trackers, these effects will inevitably lead to pointing errors, as there is no a prior information about the sun's position to provide a secondary means of controlling the concentrator's position. In the case of open loop trackers, where the solar position information is used to correct for errors in the calculated solar position, the centroid errors arising from atmospheric scattering may be avoided by simply ignoring the data when it is deemed to be unreliable. Unfortunately, making that determination in an automated manner is challenging. Fairly sophisticated digital image processing algorithms may potentially be required to determine when the solar position information would be reliable enough to use for calibration points.

In order to effectively capture the maximum available solar energy from the sun, improvements to solar position sensors are needed.

BRIEF SUMMARY OF THE INVENTION

The disclosed examples provide devices and methods for locating the centroid of the sky's intensity and determining whether the centroid data provide a reliable indicator of the sun's actual position. The determination of data fidelity is made through the combination of intensity data and recent centroid data. Though the preferred embodiment uses a position sensing diode (PSD), it will be apparent that the method may be applied to any apparatus capable of rendering analog or digital signals representing the celestial intensity and associated centroid position such as the four photodiode method employed in sunpointers.

BRIEF DESCRIPTION OF THE SEVERAL VIEWS OF THE DRAWING(S)

FIG. 5 is a table showing time, x position, first derivative and second derivative of the output plotted in FIG. 3 and FIG. 4.

DETAILED DESCRIPTION OF THE INVENTION

The disclosed examples are based on the understanding that both the intensity and the position of the sun are predictable and smoothly varying over time. A solar position sensor that provides both intensity and position data may thus be used to assess the reliability of the data in real time. Any apparatus capable of rendering analog or digital signals representing the celestial intensity and associated centroid position of the sun may be used as a solar position sensor to gather the necessary data.

Figure 1:
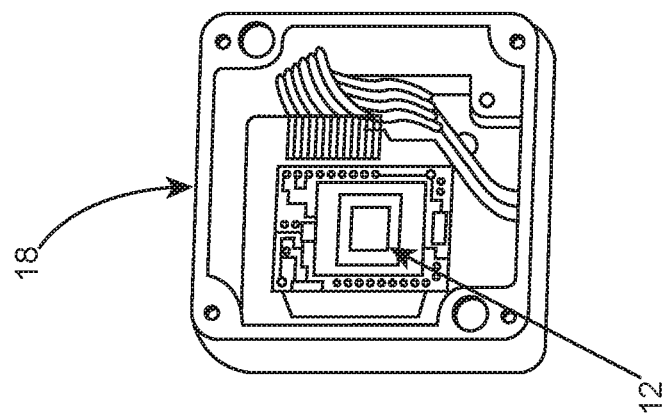
FIG. 1 is an illustration of an exemplary solar position sensor with various elements identified.
Figure 1:
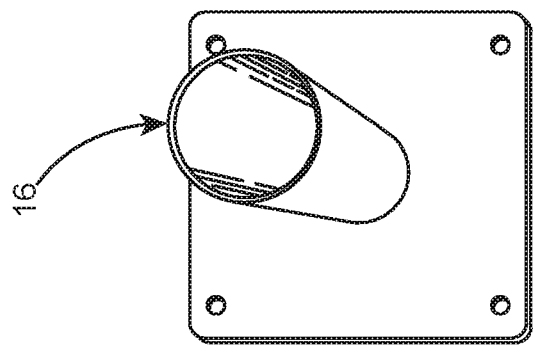
Figure 1:
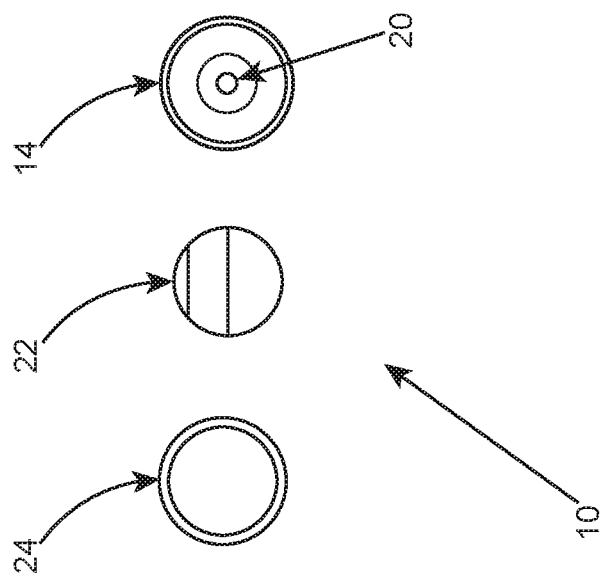
Figure 2:
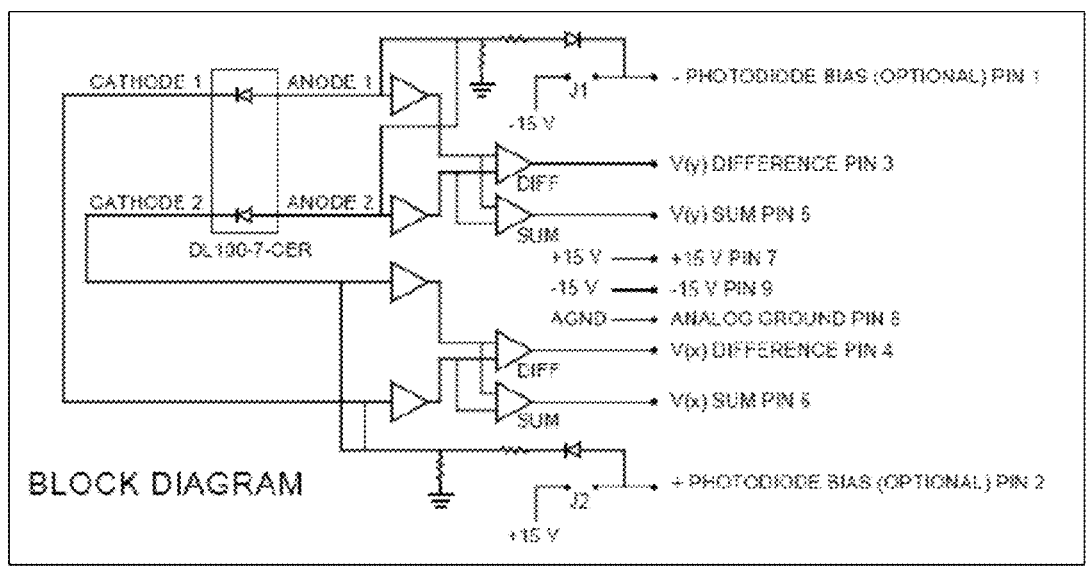
FIG. 2 is an electronic schematic of a position sensing diode showing the various output channels available for analysis.

The Oak Ridge National Lab (ORNL) prototype sensing device 10 includes a position sensing diode (PSD) 12, a pinhole disk 14, and an extension tube 16 to separate the two by a known distance as illustrated in FIG. 1. The pinhole disk 14 allows a ray of light from the sun to pass through the disk 14 and strike the active area of the PSD 12 which produces two voltage signals that are indicative of the x and y location of the centroid of the light striking the surface along with two voltage signals that represent the intensity of the light. The PSD, which is encased in a housing 18, is a Pacific Silicon Sensor Inc. DL100-7PCBA3 model. The "sum" pin outputs provide the sun's intensity data and the "difference" pin outputs provide the sun's x and y centroid location data as illustrated by the schematic block diagram of FIG. 2.

In the solar position sensing device 10, the housing 18, disk 14 and extension tube 16 may be made from metal, plastic, composites or other rigid materials. The extension tube is a tube having a known, fixed length. In some examples the length is less than 1 inch, in other examples the tube is between 1 inch and 2 inches in length, and in yet other examples, the tube is greater than 2 inches in length. The extension tube 16 includes a body that defines a dark duct. In general, the tube has a cross sectional shape that is circular, although other shapes may certainly be used.

A disk 14 includes a body that defines an aperture or pinhole 20 that includes a diameter. In some examples, the pinhole is less than 300 µm in diameter, in other examples, the pinhole is approximately equal to 300 µm in diameter, and in other examples, the pinhole is greater than 300 µm in diameter. In other examples, the aperture is between 50 µm and 100 µm in diameter. In other examples, the aperture is between 100 µm and 300 µm in diameter.

In some examples, a neutral density (ND) filter 22 is disposed between the disk 14 having the pinhole 20 and the sun. The disk 14 and the ND filter 22 are joined with the extension tube 16 with a retaining ring 24. The retaining ring 24 may be a threaded ring, a c-clip ring, or some other attachment means.

Figure 3:
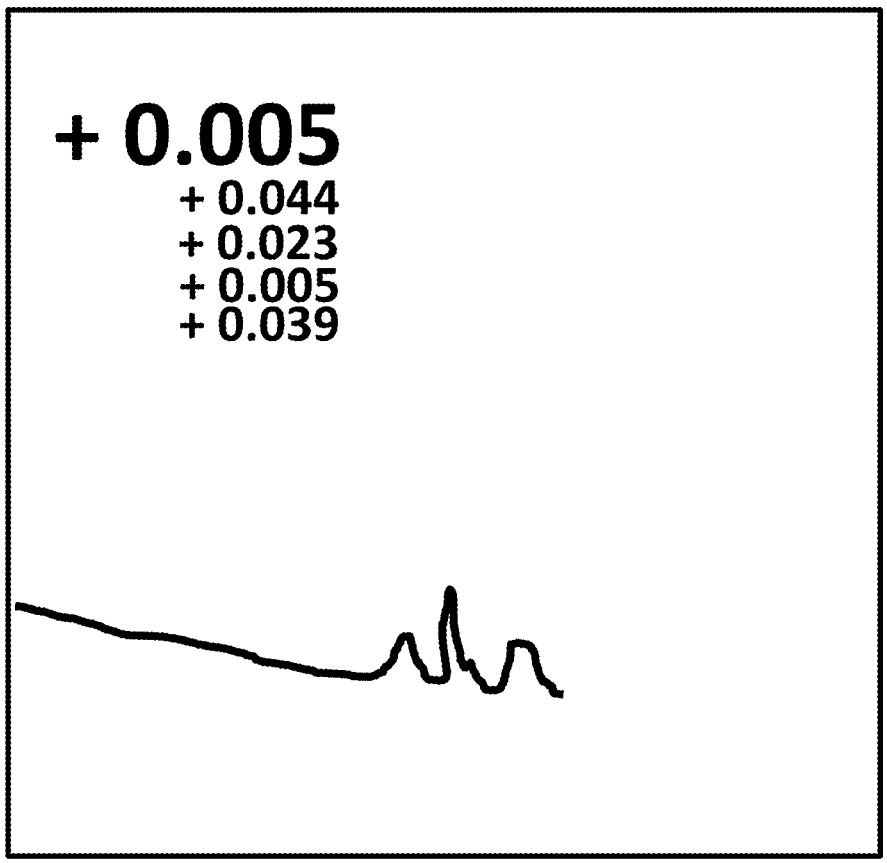
FIG. 3 is a screen of a voltmeter plotting an output of a single axis of the exemplary solar sensor of FIG. 1.

Because the sun's apparent movement across the sky is smooth, the nature of the centroid data from the position sensor provides a very good indication of the reliability of the measured data. FIG. 3 shows the output of a single axis (X) of the PSD solar sensor device prototype 10. The data are being plotted on the screen of a graphical voltmeter, measuring volts over time. The device 10 was initially pointed at the sun during very clear sky conditions and the output monitored to observe the effect of the sun's movement. This is shown in the smoothly varying position data in the first part of the plot (left-hand side). During the test, a small cloud appeared in the sky at the sun's position and the result was a very erratic movement of the apparent position of the sun, which is not indicative of the sun's true position, because it is not smoothly varying.

Figure 4:
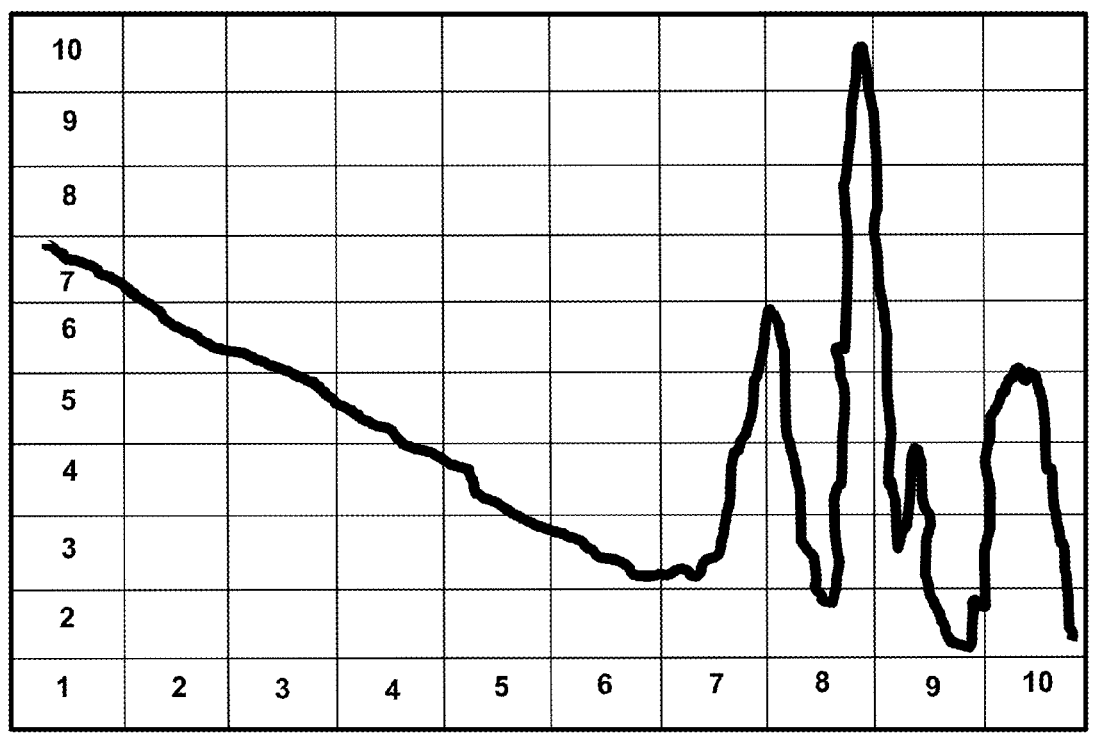
FIG. 4 is the screen of FIG. 3 with a grid overlaid.

These data of FIG. 3 are enlarged in FIG. 4 with a grid overlaid to facilitate measurements of voltage (Y-Axis) vs time (X-Axis) in arbitrary units. FIG. 5 shows the time and x position along with the first and second derivatives of the curve representing the position data of FIG. 4. The second derivative column ($d^2x/dt^2$) clearly shows a dramatic increase in magnitude coincident with the time point at which the data become unreliable (e.g., time points 7-10) of FIGS. 4 and 5. This is one method by which the position data may be analyzed to determine fidelity.

Figure 6:
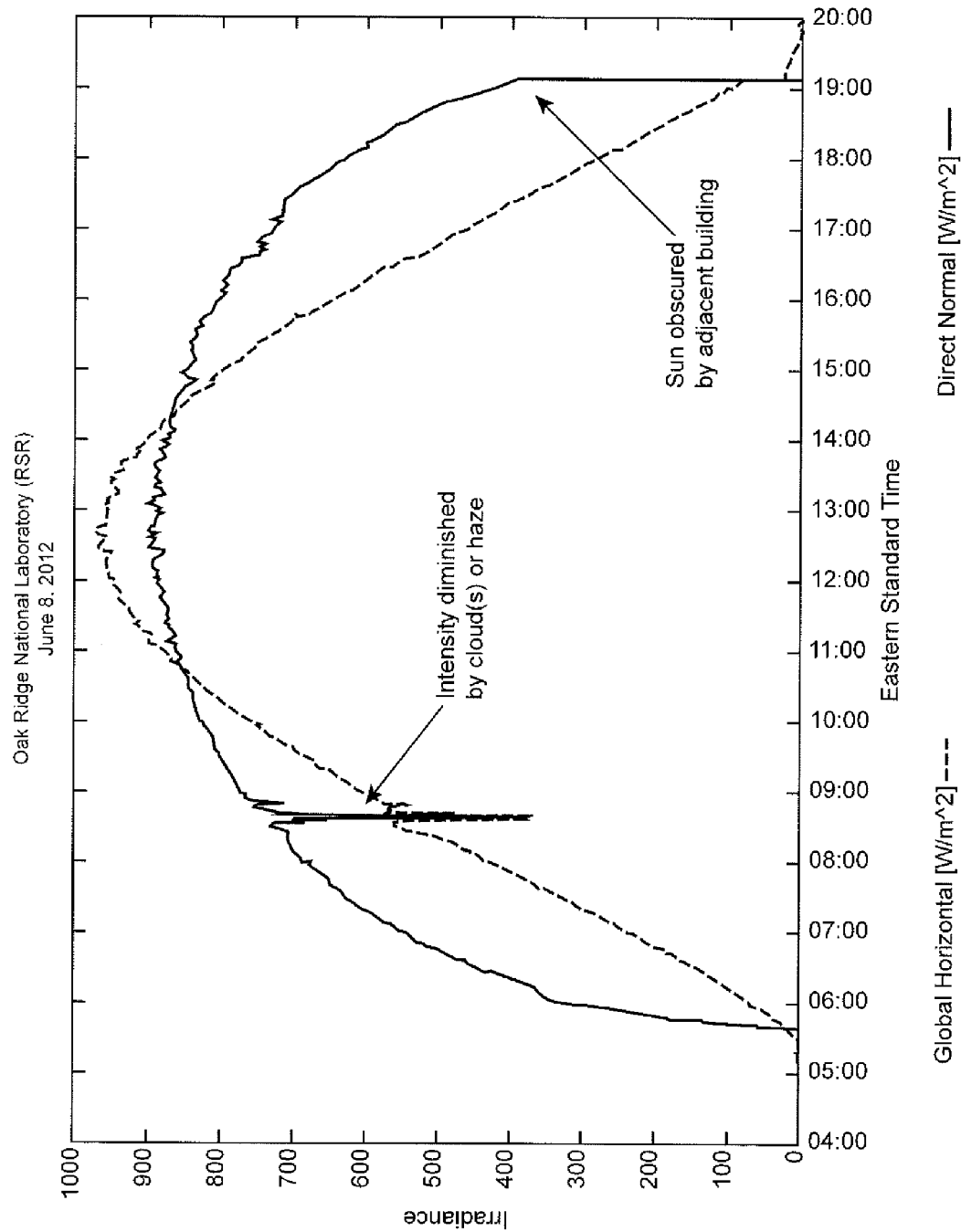
FIG. 6 is a plot of the global horizontal and total sky intensity in irradiance measured over a single day.

The second aspect of this invention relies on the use of intensity data from the solar position device 10. For a given day of the year and time of day the sun's un-obscured intensity is smooth and very predictable. The plot in FIG. 6 shows the sun's intensity during a single day of Jun. 8, 2012 in Oak Ridge, Tenn., US. The two curves represent the global horizontal or total sky intensity (higher curve) and the direct normal intensity (lower and wider curve). The direct normal intensity is the intensity that one would expect for a solar tracking system.

In FIG. 6, the data for that day show one dramatic dip at around 08:30-08:45 EST that appears to be due to clouds or heavy haze and is not indicative of the sun's actual intensity. When assessing the data from the solar position sensing device 10, the first assessment is to ensure that the intensity falls into a range expected for the date and time at that location. If it is below that value, or above, it indicates that there is attenuation, or concentrating reflection, of the sun's intensity that would make the fidelity of the position data unreliable.

During the middle of the day, 12:00-13:00 EST, small intensity fluctuations are measured. The magnitude of these fluctuations may be indicative of the fidelity of the position data that is possible using the PSD solar position sensor when the sun is at its highest level in the sky. As in the case of the position data, the derivatives of the intensity data may be useful in providing a fidelity assessment of the position data. For example, the second derivative at approximately 08:30 EST would show rapidly increasing or rapidly decreasing values from the most-previous values measured immediately before 08:30 EST.

Figure 7:
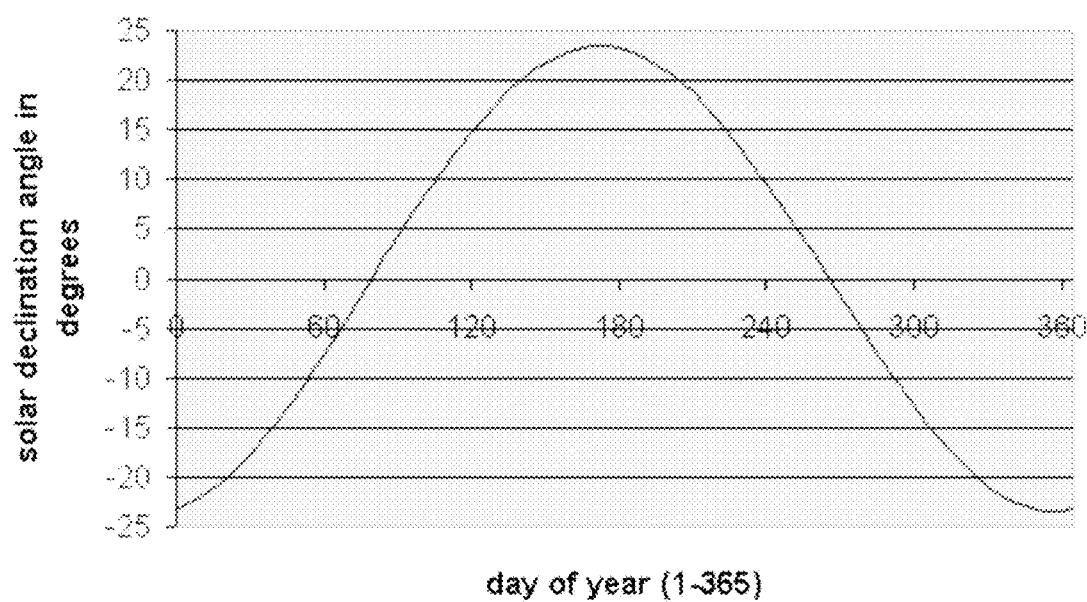
FIG. 7 is a plot of the solar declination angle in degrees for each day of the year.

In the case of open loop control systems that rely only on the solar position sensor to provide corrective inputs, a lookup table or algorithm is constructed based on acquired data. This enables predictive adjustments to be made on the basis of previously acquired data even if the sky conditions were less than ideal for the data to be used directly. In a very simple example, if thin wispy clouds were present on a given day, but clear sky conditions had been present for all of the previous day, the angular adjustments that were deemed necessary the previous day could be used in play of the current readings. These data could be used directly or could be compensated based on the a priori knowledge of the solar declination as illustrated in FIG. 7.

Figure 8:
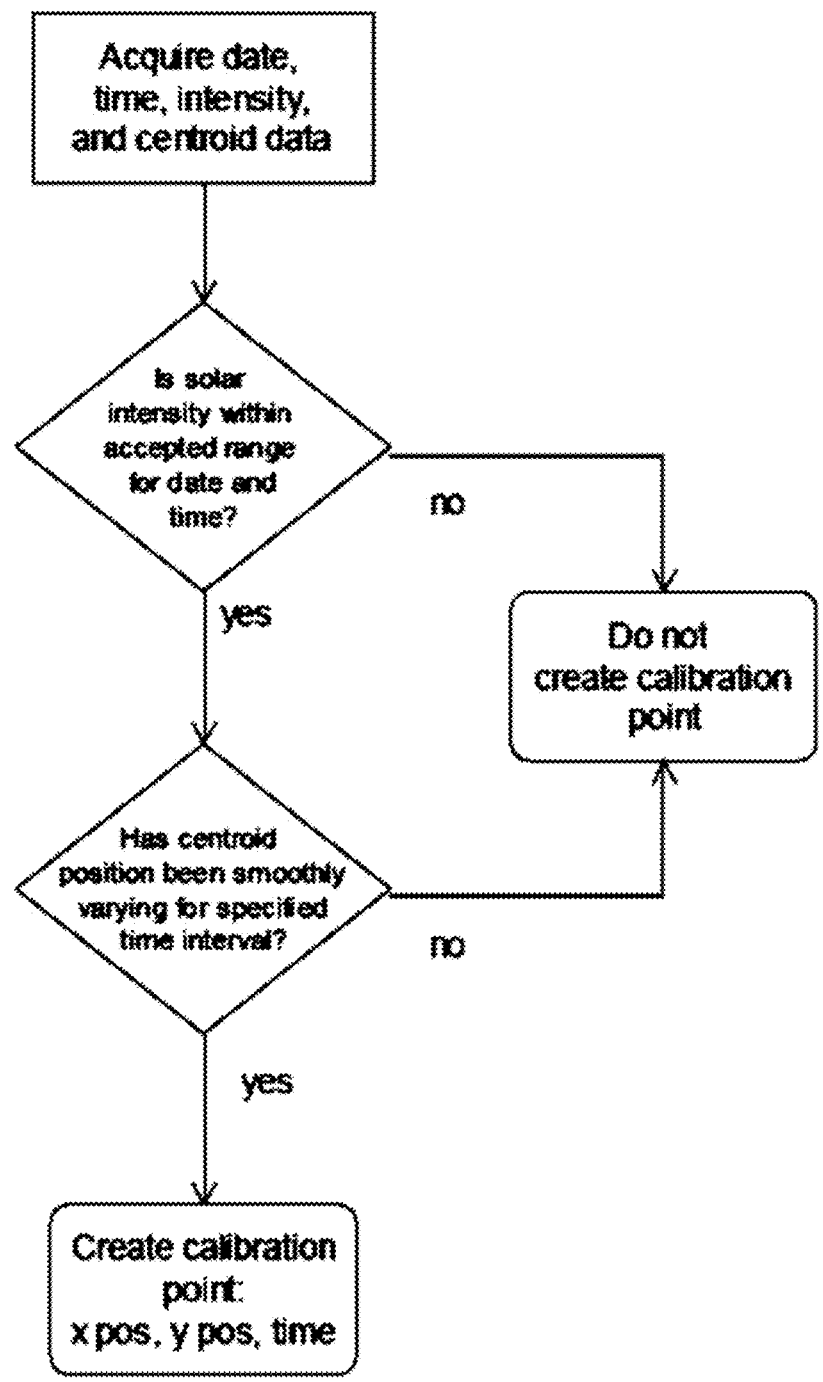
FIG. 8 is a block diagram of an exemplary method.

The data necessary to populate the lookup table or create the algorithm is acquired by creating calibration points for multiple times of day and days of the year. Data points are only created when the fidelity of the position data was deemed to be reliable. Thus, if clear sky conditions persisted for an entire year, an entire matrix of data could, in theory, be populated. That would obviously never occur but the data for the unpopulated points within the matrix or algorithm could be populated by interpolative curve fits based upon the extant set of reliable calibration data points. A representative flow chart for creating reliable data points is shown in FIG. 8.

In one example of a solar position tracker, a solar position sensor 10 capable of generating voltage signals that are indicative of the sun's measured Y centroid value, measured Y intensity value, measured X centroid value and measured X intensity value is provided. A computing device such as a desktop, laptop, tablet, smart phone or the like is used to receive the measured values and determine if the fidelity is acceptable for use in positioning the solar array. The computing device includes a clock for generating a time signal, a non-transitory memory for storing the voltage signal values from said solar position sensor and storing the time signal value from the clock that is indicative of the time that the voltage signal values are generated, a processor for analyzing the fidelity of the voltage signal values, and an output device for delivering output signals or values indicative of a calculated azimuth and a calculated elevation of the sun.

The processor analyzes the fidelity of the Y centroid and X centroid voltage signal values by using a best fit algorithm to generate an equation of a function defined by each measured centroid value and time value pairs stored in the memory. Here, the processor calculates or determines a first derivative $(dx/dt)$ and a second derivative $(d^2x/dt^2)$ for each function at each time value, and delivers output signals indicative of a calculated azimuth value and a calculated elevation value based on the values of $(dx/dt)$ and $(d^2x/dt^2)$ for the latest time to the output device.

In some examples, the processor calculates the azimuth and elevation values using the measured Y centroid value and measured X centroid value if the values of $(dx/dt)$ at the latest time are each less than a predetermined rate of change of the values of $(dx/dt)$ at the previous time. For example, the predetermined rate of change may be within 2%, 5% or 10% of $(dx/dt)$ determined at the previous time.

In some examples, the measured Y centroid value and measured X centroid value are each stored in the memory as a historical Y centroid value and a historical X centroid value for that time value respectively.

In some examples, the processor calculates the azimuth and elevation values using the historical Y centroid value and historical X centroid value if one of the values of $(dx/dt)$ at the latest time is greater than the predetermined rate of change of the value of $(dx/dt)$ at the previous time.

In some examples, the processor calculates the azimuth and elevation values using the measured Y centroid value and measured X centroid value if the values of $(d^2x/dt^2)$ at the latest time are each less than a predetermined rate of change of the values of $(d^2x/dt^2)$ at the previous time. For example, the predetermined rate of change may be within 2%, 5% or 10% of $(d^2x/dt^2)$ determined at the previous time.

In some examples, the measured Y centroid value and measured X centroid value are each stored in the memory as a historical Y centroid value and a historical X centroid value for that time value respectively.

In some examples, the processor calculates the azimuth and elevation values using the historical Y centroid value and historical X centroid value if one of the values of $(d^2x/dt^2)$ at the latest time is greater than the predetermined rate of change of the value of $(d^2x/dt^2)$ at the previous time.

In some examples, the processor analyzes the fidelity of the Y intensity and X intensity voltage signal values by using a best fit algorithm to generate an equation of a function defined by each measured intensity value and time value pairs stored in the memory. The processor then calculates $(dx/dt)$ and $(d^2x/dt^2)$ for each function at each time value, and delivers output signals indicative of a calculated azimuth value and a calculated elevation value based on the values of $(dx/dt)$ and $(d^2x/dt^2)$ for the latest time to the output device.

In some examples, the processor calculates the azimuth and elevation values using the measured Y centroid value and measured X centroid value if the values of $(dx/dt)$ at the latest time are each less than the predetermined rate of change of the values of $(dx/dt)$ at the previous time.

In some examples, the measured Y centroid value and measured X centroid value are each stored in the memory as a historical Y centroid value and a historical X centroid value for that time value respectively.

In some examples, the processor calculates the azimuth and elevation values using the historical Y centroid value and historical X centroid value if one of the values of $(dx/dt)$ at the latest time is greater than the predetermined rate of change of the value of dx/dt at the previous time.

In some examples, the processor calculates the azimuth and elevation values using the measured Y centroid value and measured X centroid value if the values of $(d^2x/dt^2)$ at the latest time are each less than a predetermined rate of change of the values of $(d^2x/dt^2)$ at the previous time.

In some examples, the measured Y centroid value and measured X centroid value are each stored in the memory as a historical Y centroid value and a historical X centroid value for that time value respectively.

In some examples, the processor calculates the azimuth and elevation values using the historical Y centroid value and historical X centroid value if one of the values of $(d^2x/dt^2)$ at the latest time is greater than the predetermined rate of change of the value of $(d^2x/dt^2)$ at the previous time.

In some examples, the processor analyzes the fidelity of the Y intensity and X intensity voltage signal values by comparing the values to a historical intensity value for that date, location, and time. Here, the processor delivers output signals indicative of a calculated azimuth value and a calculated elevation value based on differences between the Y intensity and X intensity voltage signal values and the historical intensity value for that date, location, and time.

In some examples, the differences between the Y intensity and X intensity voltage signal values and the historical intensity value for that date, location, and time are compared to a predetermined range. For example, the predetermined range may be within 2%, 5% or 10% of the historical intensity value.

In some examples, the measured Y intensity and X intensity voltage signal values are used if the values are less than the predetermined range.

In some examples, the historical intensity value for that date, location, and time are used if the values are greater than the predetermined range.

We now describe a generalized example of a suitable computing system in which several of the described innovations may be implemented. The computing system is not intended to suggest any limitation as to scope of use or functionality, as the innovations may be implemented in diverse general-purpose or special-purpose computing systems.

The computing system includes one or more processing units and memory. The processing units execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, a central processing unit as well as a graphics processing unit or co-processing unit may be used. The tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, the computing system includes storage, one or more input devices, one or more output devices, and one or more communication connections. An interconnection mechanism such as a bus, controller, or network interconnects the components of the computing system. Typically, operating system software provides an operating environment for other software executing in the computing system, and coordinates activities of the components of the computing system.

The tangible storage may be removable or non-removable, and includes magnetic disks, magnetic tapes or cassettes, CD-ROMs, DVDs, or any other medium which can be used to store information in a non-transitory way and which can be accessed within the computing system. The storage stores instructions for the software implementing one or more innovations described herein.

The input device(s) may be a touch input device such as a keyboard, mouse, pen, or trackball, a voice input device, a scanning device, or another device that provides input to the computing system. For video encoding, the input device(s) may be a camera, video card, TV tuner card, or similar device that accepts video input in analog or digital form, or a CD-ROM or CD-RW that reads video samples into the computing system. The output device(s) may be a display, printer, speaker, CD-writer, or another device that provides output from the computing system.

The communication connection(s) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

In one example environment, the cloud provides services for connected devices with a variety of screen capabilities. A connected device represents a device with a computer screen (e.g., a mid-size screen). For example, connected device could be a personal computer such as desktop computer, laptop, notebook, netbook, or the like. Connected device represents a device with a mobile device screen (e.g., a small-size screen). For example, connected device could be a mobile phone, smart phone, personal digital assistant, tablet computer, and the like. Connected device represents a device with a large screen. For example, connected device could be a television screen (e.g., a smart television) or another device connected to a television (e.g., a set-top box or gaming console) or the like. One or more of the connected devices can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment. For example, the cloud can provide services for one or more computers (e.g., server computers) without displays.

Services can be provided by the cloud through service providers, or through other providers of online services (not depicted). For example, cloud services can be customized to the screen size, display capability, and/or touch screen capability of a particular connected device.

In the example environment, the cloud provides the technologies and solutions described herein to the various connected devices using, at least in part, the service providers. For example, the service providers can provide a centralized solution for various cloud-based services. The service providers can manage service subscriptions for users and/or devices (e.g., for the connected devices and/or their respective users).

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

The systems and methods described above are applicable to different applications in the solar energy field. For example, the systems and methods will provide for accurate and real-time positioning of solar water heating collectors, water purification stills, photovoltaic panels and the like. Structures designed to take advantage of solar energy will benefit by using these systems and methods for controlling the opening and closing of awnings, shades, blinds, skylights, fans and windows to control the interior temperatures. The system and methods provide real-time control of solar devices in order to reduce inaccurate or incorrect placement of such devices for increased energy efficiencies and reduced pay-back periods.

While this disclosure describes and enables several examples of a solar position sensor apparatus and method, other examples and applications are contemplated. Accordingly, the invention is intended to embrace those alternatives, modifications, equivalents, and variations as fall within the broad scope of the appended claims.

The technology disclosed and claimed herein may be available for licensing in specific fields of use by the assignee of record.

What is claimed is:

1. An apparatus for providing accurate and real-time azimuth and elevation signals to a solar device for improved efficiency comprising:
a solar position sensor having a pin hole disk separated from a position sensing diode by an extension tube of a known length, said sensor capable of generating voltage signals that are indicative of the sun's measured Y centroid value, measured Y intensity value, measured X centroid value and measured X intensity value; and
a computing device having a clock for generating a time signal, a non-transitory memory for storing the voltage signal values from said solar position sensor and storing the time signal value from the clock that is indicative of the time that the voltage signal values are generated, a processor for analyzing the fidelity of the voltage signal values, and an output device for delivering output signals to the solar device that are indicative of a calculated azimuth and a calculated elevation of the sun for accurate and real-time positioning of the solar device during all sun visibility conditions.

2. The apparatus of claim 1 wherein the processor:
analyzes the fidelity of the Y centroid and X centroid voltage signal values by using a best fit algorithm to generate an equation of a function defined by each measured centroid value and time value pairs stored in the memory;
calculates $dx/dt$ and $d^2x/dt^2$ for each function at each time value; and
delivers output signals indicative of a calculated azimuth value and a calculated elevation value based on the values of $dx/dt$ and $d^2x/dt^2$ for the latest time to the output device.

3. The apparatus of claim 2 wherein the processor calculates the azimuth and elevation values using the measured Y centroid value and measured X centroid value if the values of $dx/dt$ at the latest time are each less than a predetermined rate of change of the values of $dx/dt$ at the previous time.

4. The apparatus of claim 3 wherein the measured Y centroid value and measured X centroid value are each stored in the memory as a historical Y centroid value and a historical X centroid value for that time value respectively.

5. The apparatus of claim 2 wherein the processor calculates the azimuth and elevation values using the historical Y centroid value and historical X centroid value if one of the values of $dx/dt$ at the latest time is greater than a predetermined rate of change of the value of $dx/dt$ at the previous time.

6. The apparatus of claim 2 wherein the processor calculates the azimuth and elevation values using the measured Y centroid value and measured X centroid value if the values of $d^2x/dt^2$ at the latest time are each less than a predetermined rate of change of the values of $d^2x/dt^2$ at the previous time.

7. The apparatus of claim 6 wherein the measured Y centroid value and measured X centroid value are each stored in the memory as a historical Y centroid value and a historical X centroid value for that time value respectively.

8. The apparatus of claim 2 wherein the processor calculates the azimuth and elevation values using the historical Y centroid value and historical X centroid value if one of the values of $d^2x/dt^2$ at the latest time is greater than a predetermined rate of change of the value of $d^2x/dt^2$ at the previous time.

9. The apparatus of claim 1 wherein the processor:
analyzes the fidelity of the Y intensity and X intensity voltage signal values by using a best fit algorithm to generate an equation of a function defined by each measured intensity value and time value pairs stored in the memory;
calculates $dx/dt$ and $d^2x/dt^2$ for each function at each time value; and
delivers output signals indicative of a calculated azimuth value and a calculated elevation value based on the values of $dx/dt$ and $d^2x/dt^2$ for the latest time to the output device.

10. The apparatus of claim 9 wherein the processor calculates the azimuth and elevation values using the measured Y centroid value and measured X centroid value if the values of $dx/dt$ at the latest time are each less than a predetermined rate of change of the values of $dx/dt$ at the previous time.

11. The apparatus of claim 10 wherein the measured Y centroid value and measured X centroid value are each stored in the memory as a historical Y centroid value and a historical X centroid value for that time value respectively.

12. The apparatus of claim 9 wherein the processor calculates the azimuth and elevation values using the historical Y centroid value and historical X centroid value if one of the values of dx/dt at the latest time is greater than a predetermined rate of change of the value of dx/dt at the previous time.

13. The apparatus of claim 9 wherein the processor calculates the azimuth and elevation values using the measured Y centroid value and measured X centroid value if the values of $d^2x/dt^2$ at the latest time are each less than a predetermined rate of change of the values of $d^2x/dt^2$ at the previous time.

14. The apparatus of claim 13 wherein the measured Y centroid value and measured X centroid value are each stored in the memory as a historical Y centroid value and a historical X centroid value for that time value respectively.

15. The apparatus of claim 7 wherein the processor calculates the azimuth and elevation values using the historical Y centroid value and historical X centroid value if one of the values of $d^2x/dt^2$ at the latest time is greater than a predetermined rate of change of the value of $d^2x/dt^2$ at the previous time.

16. The apparatus of claim 1 wherein the processor:
analyzes the fidelity of the Y intensity and X intensity voltage signal values by comparing the values to a historical intensity value for that date, location, and time; and
delivers output signals indicative of a calculated azimuth value and a calculated elevation value based on differences between the Y intensity and X intensity voltage signal values and the historical intensity value for that date, location, and time.

17. The apparatus of claim 16 wherein the differences between the Y intensity and X intensity voltage signal values and the historical intensity value for that date, location, and time are compared to a predetermined range.

18. The apparatus of claim 17 wherein the measured Y intensity and X intensity voltage signal values are used if the values are less than the predetermined range.

19. The apparatus of claim 18 wherein the historical intensity value for that date, location, and time are used if the values are greater than the predetermined range.

\* \* \* \* \*